United States Patent
Lista

(10) Patent No.: US 8,912,245 B2
(45) Date of Patent: Dec. 16, 2014

(54) AROMATIC POLYESTERS, POLYOL BLENDS COMPRISING THE SAME AND RESULTANT PRODUCTS THEREFROM

(71) Applicant: Dow Global Technologies LLC, Midland, MI (US)

(72) Inventor: Giuseppe Lista, Modena (IT)

(73) Assignee: Dow Global Technologies LLC, Midland, MI (US)

( * ) Notice: Subject to any disclaimer, the term of this patent is extended or adjusted under 35 U.S.C. 154(b) by 9 days.

(21) Appl. No.: 13/930,942

(22) Filed: Jun. 28, 2013

(65) Prior Publication Data

US 2013/0289151 A1 Oct. 31, 2013

Related U.S. Application Data

(63) Continuation of application No. 13/056,671, filed as application No. PCT/EP2009/060123 on Aug. 4, 2009, now abandoned.

(51) Int. Cl.
| | | |
|---|---|---|
| *C08G 18/00* | (2006.01) | |
| *C08J 9/04* | (2006.01) | |
| *C08G 18/42* | (2006.01) | |
| *C08G 101/00* | (2006.01) | |

(52) U.S. Cl.
CPC ............... *C08J 9/04* (2013.01); *C08G 18/4213* (2013.01); *C08G 18/4252* (2013.01); *C08G 2101/0025* (2013.01)
USPC .......................................... 521/172; 521/170

(58) Field of Classification Search
USPC .......................................................... 521/172
See application file for complete search history.

(56) References Cited

U.S. PATENT DOCUMENTS 4,469,824 A * 9/1984 Grigsby et al. ................ 521/173
5,097,004 A * 3/1992 Gallagher et al. ............. 528/272

* cited by examiner

*Primary Examiner* — Melissa Rioja

(57) ABSTRACT

The present invention discloses low viscosity aromatic polyester polyols suitable for blending with other polyols or other materials mutually compatible with the polyester polyols to achieve polyurethane and polyisocyanurate products. In particular the present invention discloses polyester polyols comprising the reaction of: A) an aromatic component comprising at 80 mole percent or greater of terephthalic acid; B) polyethylene glycol having a molecular weight from 150 to 1000; and C) a glycol different from the glycol of B); wherein A, B, and C are present in the reaction on a percent weight bases of 20 to 60 weight percent A); 40 to 75 weight percent of B); and 0 to 40 weight percent of C).

9 Claims, No Drawings

AROMATIC POLYESTERS, POLYOL BLENDS COMPRISING THE SAME AND RESULTANT PRODUCTS THEREFROM

The present invention relates generally to certain polyesters polyols suitable for blending with other polyols or other materials mutually compatible with the polyester polyols to achieve polyurethane and polyisocyanurate products.

BACKGROUND OF THE INVENTION

The use of a polyol in the preparation of polyurethanes by reaction of the polyol with a polyisocyanate in the presence of a catalyst and perhaps other ingredients is well known. Aromatic polyester polyols are widely used in the manufacture of polyurethane and polyurethane-polyisocyanurate foams and resins.

Aromatic polyester polyols are attractive because they tend to be low in cost, yet can be used to produce a wide variety of cellular foams having excellent properties and adaptable for many end use applications. One class of aromatic polyester polyols used commercially is polyol products produced by esterification of phthalic acid or phthalic acid anhydride with an aliphatic polyhydric alcohol, for example, diethylene glycol. This type of polyester polyol is capable of reacting with organic isocyanates to produce, for example, coatings, adhesives, sealants, and elastomers ("CASE materials"), that can have excellent characteristics, such as tensile strength, adhesion, and abrasion resistance. Such aromatic polyester polyols may also be used in formations for production of rigid polyurethane or polyisocyanurate foam.

One problem generally encountered when using aromatic polyester polyols, with a desirable high aromatic ring content, is that they are generally characteristically high in dynamic viscosity, making handling very difficult. Often, aromatic polyester polyols must be diluted or dissolved in relatively large amounts of a suitable solvent to enable producing low viscosity, easy-to-apply coating compositions upon being mixed with a curing or crosslinking agent.

Ideally, an aromatic polyester polyol has a dynamic viscosity that is sufficiently low to allow ease of pumping and mixing without the use of solvents or other viscosity modifying additives. An aromatic polyester polyol having too great a dynamic viscosity can cause difficulties in transfer of the material, as for example from storage to reactor or from the final product to the final application of the product. Excessive dynamic viscosity also can be a serious obstacle to efficient mixing with other CASE material ingredients, such as an isocyanate.

Thus, there is a need for low viscosity aromatic polyester polyols that are economical to produce and can be converted into cellular foams and other CASE materials having excellent properties. It is further desirable to have an aromatic polyester polyol having a low viscosity and can also meet the required needs for flame retardation.

SUMMARY OF THE INVENTION

The present invention relates to a new and surprisingly useful class of low viscosity aromatic polyester polyols having an average functionality of about two, comprising the inter-esterification reaction product of terephthalic acid and at least one polyethylene diol. The invention also relates to methods for making such aromatic polyester polyols and methods for using such aromatic polyester polyols to produce CASE materials. The invention further relates to cellular polyurethane and polyurethane/polyisocyanurate foams made using such aromatic polyester polyols. The polyester polyols of the present invention may be utilized with a wide variety of blowing agents, including water, hydrocarbon, chlorofluorocarbon, and non-chlorofluorocarbon blowing agents.

The aromatic polyester polyols of the present invention can be readily blended with prior art polyols, if desired, and also with various additives conventionally used in the formulation of resin pre-polymer blends. The aromatic polyester polyols of the invention are prepared by an inter-esterification process that is simple, reliable, and well adapted for conventional chemical processing equipment.

In one aspect, the present invention provides a polyester polyol comprising the reaction product of:
  A) an aromatic component comprising at 80 mole percent or greater of terephthalic acid;
  B) polyethylene glycol having a molecular weight from 150 to 1000; and
  C) a glycol different from the glycol of B);
  wherein A, B, and C are present in the reaction on a percent weight bases of 20 to 60 weight percent A); 40 to 75 weight percent of B); and 0 to 40 weight percent of C).

Another aspect of the invention provides a polyol blend, suitable for use in preparing polymeric foams or elastomers comprising urethane units. The polyols blends are particularly useful in polyol formulations for rigid spray foam applications. These blends comprise from 10 to 90 weight percent of an aromatic polyester polyol as described above and the remainder is at least one second polyol wherein the second polyols is a monol, a polyether polyol or a combination thereof having a functionality of 2 to 8 and a molecular weight of 100 to 10,000.

In further embodiment, there is provided a sprayable blend for making a rigid foam comprising urethane units. The rigid foam made from a sprayable polyol blend is the reaction product of a polyisocyanate and a polyol blend where the polyol blend comprises 30 to 60 weight percent of an aromatic polyester polyol of the present invention and at least one second polyol having a functionality of 2 to 6 and a hydroxyl number of 200 to 1,200. The isocyanate index in preparing such rigid foams is from 90 to 400.

The present invention further provides for use of the aromatic polyester polyols of the present invention as a viscosity cutter for polyol formulations, particularly for sprayable polyol formulations for producing rigid foam.

In a further aspect, the present invention provides a reaction system for production a rigid foam comprising a polyol composition comprising:
1) a polyol which is the reaction product of
   A) an aromatic component comprising at 80 mole percent or greater of terephthalic acid;
   B) polyethylene glycol having a molecular weight from 150 to 1000; and
   C) a glycol different from the glycol of B);
   wherein A, B, and C are present in the reaction on a percent weight bases of 20 to 60 weight percent A); 40 to 75 weight percent of B); and 0 to 40 weight percent of C);
2) a polyisocyanate and
3) optionally additives and auxiliaries known per se. Such optional additives or auxiliaries are selected from the groups consisting of dyes, pigments, internal mold release agents, physical blowing agents, chemical blowing agents, fire retardants, fillers, reinforcements, plasticizers, smoke suppressants, fragrances, antistatic agents, biocides, antioxidants, light stabilizers, adhesion promotors and combination of these.

DETAILED DESCRIPTION OF THE PREFERRED EMBODIMENT

The aromatic polyester polyols of the present invention are prepared from a reaction mixture comprising A) terephthalic acid and B) a at least one polyethylene glycol. In a further embodiment, the reaction mixture may contain a further glycol, component C), which is a glycol other than the polyethylene glycol. Such polyols generally have nominal functionally of 2. To balance the properties of aromatic based polyester polyols, it is desirable to have a material with a low viscosity to allow for easy flow in commercial applications and have a desired level of aromatic content in the polyester. The present invention has found a combination of polyethylene glycol with terephthalic acid gives an aromatic polyester having a low viscosity while maintaining an acceptable level of aromatic content in the polyester to maintain acceptable properties of the final produced material.

While terephthalic acid generally gives enhanced flame retardant properties to the final polyurethane product versus other phthalic acid isomers, the use of terephthalic acid generally increases the viscosity of the polyester. The use polyethylene glycol, rather than diethylene glycol as commonly used to produce aromatic polyester polyols, unexpectedly gives a low viscosity polyol. The low viscosity polyester polyols allows the use of terephthalic based materials in various end-use application.

The aromatic component (component A) of the present polyester polyols is derived from terephthalic acid. The terephthalic acid component will generally comprise 80 mole percent or more of the aromatic content. In further embodiments, terephthalic acid will comprise 85 mole percent or more of the aromatic component. In another embodiment, terephthalic acid will comprise 90 mole percent or more of the aromatic component for making the aromatic polyester polyol. In another embodiment the aromatic content comprises greater than 95 mole percent is derived from terephthalic acid. In another embodiment the aromatic content is essentially derived from terephthalic acid. While the polyester polyols can be prepared from substantially pure terephthalic acid, more complex ingredients can be used, such as the side-stream, waste or scrap residues from the manufacture of terephthalic acid. Recycled materials which can be broken down into terephthalic acid and diethylene glycol, such as the digestion products of polyethylene terephthalate may be used.

Component A) will generally comprise from 20 to 60 wt % of the reaction mixture. In a further embodiment, component A) comprise 25 wt % or greater of the reaction mixture. In a further embodiment, component A) comprised 55 wt % or less of the reaction mixture.

The polyethylene glycol, component B, is a polymer of ethylene glycol and generally has a molecular weight of from 150 to 1,000. In one embodiment, the molecular weight is 160 or greater. In a further embodiment the molecular weight is less than 800, less than 600 or even less than 500. In a further embodiment the molecular weight is less than 400.

The polyethylene glycol generally comprises from 30 to 80 weight percent of the reaction mixture. In further embodiment the polyethylene glycol will comprise 35 weight percent or more of the reaction mixture. In another embodiment the polyethylene glycol will comprise 40 weight percent or more of the reaction mixture. In another embodiment, the polyethylene glycol will comprise 75 weight percent or less of the reaction mixture. In a further embodiment the polyethylene glycol will comprise 70 weight percent or less of the reaction mixture.

Polyethylene glycols are commercially available or may be produced by the addition of ethylene oxide to a 2 functional initiator by processes well known in the art.

While component B is described in terms of a polyethylene glycol, polyglycols based on glycols containing greater than 2 carbon atoms may be used provided such polyglycols are within the molecular weight as given for component B). Furthermore, it may be possible to use glycols which contain secondary hydroxyl groups. When using such glycols with secondary hydroxyl groups, it is generally preferred to cap such polyols to give a primary hydroxyl, i.e. capping with ethylene oxide, such that the polyglycol contains greater than 75% primary hydroxyls.

In addition to the aromatic component A) and the polyethylene component B), the reaction mixture may include a glycol (component C) which is different from B). When used, such a glycol, or blend of glycols, will generally have a nominal functionality of 2 to 3. While component C) may have a glycol with a functionality of greater than 3, to avoid an increase in the viscosity of the material, it is generally preferred the functionally of such a blend of glycols comprising component C) will be 3 or less.

In one embodiment, the glycol of component C) may be ethylene glycol, diethylene glycol, or an oxyalkylene glycol of the formula:

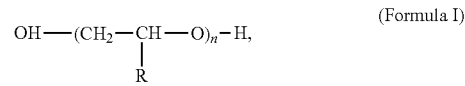

(Formula I)

where R is hydrogen or a lower alkyl of 1 to 4 carbon atoms and n is from 1 to 5 with the proviso that at least 10 percent of the R moieties are a lower alkyl group. In a further embodiment n is 4 or less. In a further embodiment n is 3 or less. In another embodiment, all the R moieties will be a lower alkyl. In a further embodiment R is a methyl group. Examples of such alkylene glycols include propylene glycol and di-propylene glycol. In a further embodiment, the glycol component C) will have an overall average molecular weight of 180 or less. Examples of three functional glycols include glycerin and trimethylolpropane.

When present, component C) will generally comprise greater than 1 weight percent of the reaction mixtures. In a further embodiment component C) will comprise 5 weight percent or greater of component C) and my at least 10 weight percent of component C). Generally when present, component C) will be less than 40 weight percent of the reactions mixture. In further embodiments, less than 35 weight percent. In another embodiment, component C) will be less than 30 weight percent of the reaction mixture.

When component C) is present, commercial products which contain a crude blend of materials may be used to provide components B) and C). For examples, production process may provide for crude glycols which contain from 15-20 weight percent diethylene glycol and the remainder triethylene and higher glycols.

Based on the components in making the polyester, the polyester will have a nominal functionality of two. When component C) is present and comprises a glycol having 3 or more hydroxyl groups, the aromatic polyester may have a nominal functionality of greater than 2. In such circumstances, the functionality will generally be less than 2.3. The amount of materials used in making the polyester will generally provide for a polyester having a hydroxyl number of from 200 to 400. In further embodiments the hydroxyl number of the polyester is less than 350 and in a further embodiment less than 300.

By inclusion of a specified amount of polypropylene glycol and if desired, a second glycol as specified above, along with the aromatic component, the viscosity of the resulting polyester is generally less than 5,000 mPa*s at 25° C. as measured by UNI EN ISO 3219. In a further embodiment the viscosity of the polyester polyol is less than 4,000 mPa*s. In other embodiments the viscosity of the polyester polyol is 3,000 mPa*s or less. In yet another embodiment the viscosity may be 2,500 mPa*s or less. In further embodiments the viscosity is 2000 mPa*s or less. While it is desirable to have a polyol with as low a viscosity as possible, due to practical chemical limitations and end-use applications, the viscosity of the polyol will generally be greater than 350 mPa*s.

An aromatic polyester polyol of the invention may include any minor amounts of unreacted glycol remaining after the preparation of the polyester polyol. Although not desired, the aromatic polyester polyol can include up to about 40 weight percent free diol. The free glycol content of the aromatic polyester polyols of the invention generally is from about 0 to about 30 weight percent, and usually from 1 to about 25 weight percent, based on the total weight of polyester polyol component. The polyester polyol may also include small amounts of residual, non-inter-esterified aromatic component. Typically the non-inter-esterified materials will be present in an amount less than 25 percent by weight based on the total weight of the components combined to form the aromatic polyester polyols of the invention.

The polyester polyols are formed by the polycondensation/transesterification and polymerization of component A and B, and if present component C under conditions well known in the art. See for Example G. Oertel, *Polyurethane Handbook*, Carl Hanser Verlag, Munich, Germany 1985, pp 54-62 and Mihail Ionescu, *Chemistry and Technology of Polyols for Polyurethanes*, Rapra Technology, 2005, pp 263-294. In general, the reaction is done at temperature of 180 to 280° C. In another embodiment the reaction is done at a temperature of at least 200° C. In a further embodiment the reaction is done at a temperature of 215° C. or greater. In a further embodiment the transesterification is done at a temperature of 260° C. or less.

While the reaction may take place under reduced or Increased pressure, the reaction is generally carried out near atmospheric pressure conditions.

While the reaction may take place in the absence of a catalyst, catalysts which promote the esterification/transesterification/polymerization reaction may be used. Examples of such catalysts include tetrabutyltitanate, dibutyl tin oxide, potassium methoxide, or oxides of zinc, lead or antimony; titanium compounds such as titanium (IV) isopropoxide and titanium acetylacetonate. When used, such catalyst is used in an amount of 0.05 to 1 weight percent of the total mixture. In further embodiments the catalyst is present in an amount of from 0.1 to 0.75 weight percent of the total mixture.

The volatile product(s) of the reaction, for example water and/or methanol, is generally taken off overhead in the process and forces the ester interchange reaction to completion.

The reaction usually takes from one to five hours. The actual length of time required varies, of course; with catalyst concentration, temperature etc. In general, it is desired not to have too long a polymerization cycle, both for economic reasons and for the reason that if the polymerization cycle is too long, thermal degradation may occur.

The polyesters of the present invention can be used as part of a polyol formulation for making various polyurethane or polyisocyanurate products. The polyol, also referred to as the isocyanate-reactive component, along with an isocyanate component make us a system for producing a polyurethane or polyisocyanurate. The polyesters may be used as part of a formulation for making a polyurethane and are particularly applicable in formulations for producing rigid foam, spray foam application, appliance insulation, elastomer formation, and various coatings, adhesives and sealant formulation.

The polyesters of the present invention may be used alone or can be blended with other known polyols to produce polyol blends. Depending on the application, the polyester will generally range from 10 to 90 wt % of the total polyol formulation. The amount polyester polyols which can be used for particular applications can be readily determined by those skilled in the art. For examples, for formulations in rigid foam applications, the polyester can generally comprise from 30 up to 80 weight percent of the polyol formulation. In other such embodiments, the polyester will comprise less than 70 weight percent of the polyol formulation. In spray formulations for rigid foam applications, the polyester will generally be 60 weight percent or less of the polyol blend. When preparing formulation for elastomer applications, the amount of polyester used in such formulations may be from 10 to about 30 weight percent of the total formulation.

Representative polyols include polyether polyols, polyester polyols different from the polyester of the present invention, polyhydroxy-terminated acetal resins, and hydroxyl-terminated amines. Alternative polyols that may be used include polyalkylene carbonate-based polyols and polyphosphate-based polyols. Preferred are polyether or polyester polyols. Polyether polyols prepared by adding an alkylene oxide, such as ethylene oxide, propylene oxide, butylene oxide or a combination thereof, to an initiator having from 2 to 8 active hydrogen atoms. The functionality of polyol(s) used in a formulation will depend on the end use application as known to those skilled in the art. For example, typically polyols suitable for preparing rigid polyurethanes include those having an average molecular weight of 100 to 10,000 and preferably 200 to 7,000. Such polyols advantageously have a functionality of at least 2, preferably 3, and up to 8, preferably up to 6, active hydrogen atoms per molecule. The polyols used for rigid foams generally have a hydroxyl number of about 200 to about 1,200 and more preferably from about 300 to about 800.

Monols may also be used as part of the polyol formulation.

For the production of polyurethane elastomer, the functionality of the polyol or polyol blend is generally from 1.8 to 2.2. The average functionality of the polyol blend does not include any chain extenders or cross-linkers which may be included in a formulation. The average equivalent weight of the polyol or polyol blend for producing elastomer is generally from 500 to 3,000, preferably from 750 to 2,500 and more preferably from 1,000 to 2,200.

Polyether polyols are made by processes will known in the art. Catalysis for this polymerization of the alkylene oxide can be either anionic or cationic, with catalysts such as KOH, CsOH, boron trifluoride, or a double cyanide complex (DMC) catalyst such as zinc hexacyanocobaltate or quaternary phosphazenium compound.

Polyols that are derived from renewable resources such as vegetable oils or animal fats can also be used as additional polyols. Examples of such polyols include castor oil, hydroxymethylated polyesters as described in WO 04/096882 and WO 04/096883, hydroxymethylated polyols as described in U.S. Pat. Nos. 4,423,162; 4,496,487 and 4,543,369 and "blown" vegetable oils as described in US Published Patent Applications 2002/0121328, 2002/0119321 and 2002/0090488.

Suitable polyisocyanates for producing polyurethane products include aromatic, cycloaliphatic and aliphatic isocyanates. Such isocyanates are well known in the art.

Examples of suitable aromatic isocyanates include the 4,4'-, 2,4' and 2,2'-isomers of diphenylmethane diisocyante (MDI), blends thereof and polymeric and monomeric MDI blends, toluene-2,4- and 2,6-diisocyante (TDI) m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenyl-methane-4,4'-diisocyanate and diphenyletherdiisocyanate and 2,4,6-triisocyanatotoluene and 2,4,4'-triisocyanatodiphenylether.

A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. In one embodiment, TDI/MDI blends are used.

Examples of aliphatic polyisocyanates include ethylene diisocyanate, 1,6-hexamethylene diisocyanate, 1,3- and/or 1,4-bis(isocyanatomethyl)cyclohexane (including cis- or trans-isomers of either), isophorone diisocyanate (IPDI), tetramethylene-1,4-diisocyanate, methylene bis(cyclohexaneisocyanate) ($H_{12}$MDI), cyclohexane 1,4-diisocyanate, 4,4'-dicyclohexylmethane diisocyanate, saturated analogues of the above mentioned aromatic isocyanates and mixtures thereof.

Derivatives of any of the foregoing polyisocyanate groups that contain biuret, urea, carbodiimide, allophonate and/or isocyanurate groups can also be used. These derivatives often have increased isocyanate functionalities and are desirably used when a more highly crosslinked product is desired.

For production of rigid polyurethane or polyisocyanurate materials, the polyisocyanate is generally a diphenylmethane-4,4'-diisocyanate, diphenylmethane-2,4'-diisocyanate, polymers or derivatives thereof or a mixture thereof. In one preferred embodiment, the isocyanate-terminated prepolymers are prepared with 4,4'-MDI, or other MDT blends containing a substantial portion or the 4,4'-isomer or MDI modified as described above. Preferably the MDI contains 45 to 95 percent by weight of the 4,4'-isomer.

The isocyanate component may be in the form of isocyanate terminated prepolymers formed by the reaction of an excess of an isocyanate with a polyol or polyester, including polyester of the present invention.

The polyesters of the present invention may be used for the production of hydroxyl terminated prepolymers formed by the reaction of an excess of the polyester with an isocyanate.

The polyisocyanate is used in an amount sufficient to provide an isocyanate index of from 80 to 600. Isocyanate index is calculated as the number of reactive isocyanate groups provided by the polyisocyanate component divided by the number of isocyanate-reactive groups in the polyurethane-forming composition (including those contained by isocyanate-reactive blowing agents such as water) and multiplying by 100. Water is considered to have two isocyanate-reactive groups per molecule for purposes of calculating isocyanate index. A preferred isocyanate index is from 90 to 400. For rigid foam and elastomer applications, the isocyanate index is generally from is from 100 to 150. For polyurethane-polyisocyanurate products, the isocyanate index will generally be greater than 150.

It is also possible to use one or more chain extenders in the formulation for production of polyurethane products. The presence of a chain extending agent provides for desirable physical properties, of the resulting polymer. The chain extenders may be blended with the polyol component or may be present as a separate stream during the formation of the polyurethane polymer. A chain extender is a material having two isocyanate-reactive groups per molecule and an equivalent weight per isocyanate-reactive group of less than 400, preferably less than 300 and especially from 31-125 daltons. Crosslinkers may also be included in formulations for the production of polyurethane polymers of the present invention. "Crosslinkers" are materials having three or more isocyanate-reactive groups per molecule and an equivalent weight per isocyanate-reactive group of less than 400. Crosslinkers preferably contain from 3-8, especially from 3-4 hydroxyl, primary amine or secondary amine groups per molecule and have an equivalent weight of from 30 to about 200, especially from 50-125.

For producing a polyurethane based elastomer, amounts of crosslinkers generally used are from about 0.1 to about 1 part by weight, especially from about 0.25 to about 0.5 parts by weight, per 100 parts by weight of polyols.

To obtain adequate curing rates, a catalyst may be included within the polyol component. Suitable catalysts Include the tertiary amine and organometallic compounds such as described in U.S. Pat. No. 4,495,081. When using an amine catalyst advantageously it is present in from 0.1 to 3, preferably from 0.1 to 1 and more preferably from 0.4 to 0.8 weight percent by total weight of polyol and optional chain extending agent. When the catalyst is an organometallic catalyst, advantageously it is present in from 0.001 to 0.2, preferably from 0.002 to 0.1 and more preferably from 0.01 to 0.05 weight percent by total weight of polyol and optional chain extending agent. Particularly useful catalysts include in the case of amine catalysts; triethylenediamine, bis(N,N-dimethylaminoethyl)ether and di(N,N-dimethylaminoethyl)amine and in the case of the organometallic catalysts; stannous octoate, dibutyltin dilaurate, and dibutyltin diacetate. Combinations of amine and organometallic catalysts advantageously may be employed.

The polyesters of the present invention are particularly suitable for use in applications where it is desired to have flame retardant properties provided by the aromatic content. The low viscosity of the polyols renders them suitable for use in rigid spray insulation foam. The low viscosity is also suitable for producing isocyanate terminated prepolymers where a low viscosity is desired. The polyols may also be used as a viscosity reducing additive in conventional polyol formulations.

Blowing agents used in polyurethane-forming composition are known in the art and include physical blowing agents such as a hydrocarbon, hydrofluorocarbon, hydrochlorofluorocarbon, fluorocarbon, dialkyl ether or fluorine-substituted dialkyl ethers, or a mixture of two or more thereof. It is generally preferred to further include water in the formulation, in addition to the physical blowing agent. In many polyol formulations, a physical blowing can act as a viscosity cutter. An advantage of the low viscosity polyester of the present invention is it may allow for greater variation in polyol formulations as there is a reduced need to rely on the physical blowing to modify system viscosity.

Blowing agent(s) are generally used is used in an amount ranging from about 10 to about 40, preferably from about 12 to about 35, parts by weight per 100 parts by weight polyol(s). Water reacts with isocyanate groups to produce carbon dioxide, which acts as an expanding gas. Water is suitably used in an amount within the range of 0.5 to 7.5, preferably from 1.5 to 5.0 parts by weight per 100 parts by weight of polyol(s). In further embodiments the amount of water will be from 1.5 to 3.5 parts by weight per 100 parts by weight of polyol(s).

In addition to the foregoing ingredients, the polyurethane-forming composition may include various auxiliary components, such as surfactants, fillers, colorants, odor masks, flame retardants, biocides, antioxidants, UV stabilizers, antistatic agents, viscosity modifiers, and the like known in the art.

Examples of suitable flame retardants include phosphorus compounds, halogen-containing compounds and melamine.

Examples of fillers and pigments include calcium carbonate, titanium dioxide, iron oxide, chromium oxide, azo/diazo dyes, phthalocyanines, dioxazines, recycled rigid polyurethane foam and carbon black.

Examples of UV stabilizers include hydroxybenzotriazoles, zinc dibutyl thiocarbamate, 2,6-ditertiarybutyl catechol, hydroxybenzophenones, hindered amines and phosphites. Except for fillers, the foregoing additives are generally used in small amounts, such as from 0.01 percent to 3 percent each by weight of the polyurethane formulation. Fillers may be used in quantities as high as 50% by weight of the polyurethane formulation.

The polyurethane-forming composition is prepared by bringing the various components together under conditions such that the polyol(s) and isocyanate(s) react, the blowing agent generates a gas, and the composition expands and cures. All components (or any sub-combination thereof) except the polyisocyanate can be pre-blended into a formulated polyol composition, if desired, which is then mixed with the polyisocyanate when the foam is to be prepared.

For preparation of solid or microcellular polyurethane polymers, such a polymer is typically prepared by intimately mixing the reaction components at room temperature or a slightly elevated temperature for a short period and then pouring the resulting mixture into an open mold, or injecting the resulting mixture into closed mold, which in either case is heated. The mixture on reacting out takes the shape of the mold to produce a polyurethane polymer of a predefined structure, which can then when sufficiently cured be removed from the mold with a minimum risk of incurring deformation greater than that permitted for its intended end application.

It should be understood that the present description is for illustrative purposes only and should not be construed to limit the scope of the present invention in any way. Thus, those skilled in art will appreciate that various modifications and alterations to the presently disclosed embodiments might be made without departing from the intended spirit and scope of the present invention. Additional advantages and details of the present invention are evident upon an examination of the following examples and appended claims.

The following examples are provided to illustrate the invention, but are not intended to limit the scope thereof. All parts and percentages are by weight unless otherwise indicated.

A description of the raw materials used in the examples is as follows.

VORANOL* CP 450 is a glycerin initiated polyoxypropylene polyol having a molecular weight of about 450.
VORANOL CP-1421 is a glycerin initiated polyoxyethylene-polyoxypropylene mixed feed polyol having a hydroxyl number of about 33, polyol available from The Dow Chemical Company under the trade designation VORANOL CP-1421.
VORANOL RH 360 is a sucrose/glycerine initiated polyoxypropylene polyol having a functionality of about 4.6 and hydroxyl number of about 360, available from The Dow Chemical Company under the tradename Voranol RH 360.
VORANOL P1010 is a glycerin initiated polyoxypropylene polyol having a molecular weight of about 1000.
VORANOL P400 is a glycerin initiated polyoxyethylene polyol having a molecular weight of about 400.
DABCO DC 5598 is a silicone surfactant available from Air Products. (DABCO is a trademark of Air Products Corporation).
Empilan NP-9 is a non-ionic ethoxylated nonyl phenol surfactant.
Simulsol TOGE is a polyether polyol having a reported hydroxyl value of 900 and functionality of 3, obtained from Seppic Inc.
TERCAROL* 5902 is an aromatic diamine initiated polyether polyoxypropylene-polyoxyethylene (36%) polyol having a hydroxyl number of 340 to 400, functionality of about 3.5, available from The Dow Chemical Company under the tradename TERCAROL 5902.
*VORANOL and TERCAROL are trademarks of The Dow Chemical Company.
Stepanpol PS 3152 is a diethylene glycol-phthalic anhydride based polyester polyol having a hydroxyl value of 290 to 325 and functionality of 2, obtained from Stepan Company.
DMEA is dimethylethanolamine (amine catalyst?).
DMCHA is N,N-Dimethylcyclohexylamine
Production of Polyester 1.

Diethylene glycol (289.5 g), polyethylene glycol 200 (1800 g) and terephthalic acid (910.5 g) are charged to a 5000 ml glass flask equipped with a nitrogen inlet tube, pneumatic stirrer, thermometer and condenser. Heat is applied and the flask contents raised to 230-235° C. At a temperature of 220° C. a titanium acetylacetonate catalyst (Tyzor AA-105 from Du Pont) is charged (0.15 g) and a little flow of nitrogen is applied. The mixture is held at 230-235° C. for 5 hours. The polyester polyol at this point has an acid No. below 0.5 mgKOH/g. The content of the flask is cooled to room temperature under atmospheric conditions.

Reference Polyester.

Into the apparatus described for Polyester 1 is added diethylene glycol (1820 g), and terephthalic acid (1680 g). The process for production the control polyester is as given for the production of Polyester 1.

The properties of Polyester 1 and the control polyester are given in Table 1.

TABLE 1

| Polyester specifications | Polyester 1 | Control |
|---|---|---|
| Acid value (mgKOH/g) | 0.4 | 0.3 |
| OH number (mgKOH/g) | 240 | 241 |
| Viscosity at 25° c. mPa * s | 1200 | 15000 |
| Physical state at 25° c. after 1 week | Liquid | Solid |

The results show the polyester prepared using polyethylene glycol has a substantially lower viscosity than the control polyester prepared using diethylene glycol.

EXAMPLE 1

Polyester 1 prepared as described above is used in formulations to prepare rigid polyisocyanurate insulation for discontinuous panels, using a high pressure machine (Cannon A40). A control formulation uses Terate 4026 polyester polyol (from Invista), an aromatic polyester polyol having a hydroxyl number of about 205 and a viscosity of approximately 2500 mPa*s @ 25° C. The formulated polyols are given in Table 1.

TABLE 2

|  | C1 | 1 |
|---|---|---|
| Voranol CP-1421 | 8.2 | 8.2 |
| Tercarol 5902 | 11.6 | 11.6 |
| Terate 4026 | 52.8 |  |
| Polyester 1 |  | 52.8 |
| TCPP (Tris chloroisopropyl phosphate) | 10.2 | 10.2 |
| TEP (Triethyl Phosphate) | 6.8 | 6.8 |
| Diethyl Ethyl Phosphonate | 5.8 | 5.8 |
| DMCHA | 0.3 | 0.3 |
| Enpilan NP-9 | 2.3 | 2.3 |
| DC 5598 silicone | 1.7 | 1.7 |
| Water | 0.3 | 0.3 |
| Total % | 100 | 100 |

The formulated polyols are combined with other additives and isocyanate M-600 given in Table 3. M-600 is a polymethylene polyphenylisocyante, available from The Dow Chemical Company, having an isocyanate content of about 30.3% and an average functionality of 2.85.

TABLE 3

|  | C1 | 1 |
|---|---|---|
| Formulated polyol | 100 | 100 |
| Catalyst* | 3.2 | 3.2 |
| Bowing agent Additive** | 5.5 | 5.5 |
| n-pentane | 9.7 | 9.7 |
| M-600 | 225 | 225 |
| Isocyanate index | 1.9 | 1.9 |

*Catalyst system containing potassium acetate (DABCO K 2097 from Air Products)
**Formic acid formulation The properties of the foaming process and resulting foam are given in Table 4.

TABLE 4

|  | C1 | 1 |
|---|---|---|
| Reactivity* |  |  |
| CT (s) | 5 | 5 |
| GT (s) | 48 | 45 |
| Tack Free Time (s) | 66 | 56 |
| FRD 30 min (Kg/m3) | 37.1 | 37.8 |
| GREEN COMP STRENGTH[2] |  |  |
| 3 min (Kpa) | 106.3 | 156 |
| 4 min (Kpa) | 123.5 | 164.8 |
| 5 min (Kpa) | 136.1 | 177.5 |
| Foam density, Jumbo mold at 45° C. |  |  |
| Density (Kg/m3)[4] | 41.7 | 42.6 |
| Friability[3] |  |  |
| (final weight – initial weight) Vinitial wg X 100% |  |  |
| DIN 4102 B2 core |  |  |
| Measurement of 5 samples (mm) | 8, 7, 6, 7, 7 | 6, 6, 6, 6, 6 |
| Average (mm) | 7 | 6 |

*CT and GT are respectively cream time and gel time as measured in seconds. FRD is free rise density.
[2]Compressive strength is measured according to UNI6350.
[3]Friability is measured according to ASTM C421.
[4]Density measured by ASTM D 1622.

The data indicates the foam produced with the polyesters of the present invention are capable of meeting the B2 test.

EXAMPLE 2

Polyester 1 is used in formulations for the production of elastomers as given in Table 5. For the production elastomers, it is generally preferred to have a high Tg of the final elastomer to avoid deformation/stress at high temperatures. The comparative utilizes the aromatic polyester Stepanpol PS 3152.

TABLE 5

|  |  | Examples |  |
|---|---|---|---|
| Raw Materials | C2 | 2 | 3 |
| StephanPol PS 3152 | 34.5 | — | — |
| Polyester 1 | — | 34.5 | 47.5 |
| Voranol P1010 | 16.2 | 16.2 | 7 |
| Voranol P400 | 14.3 | 14.3 | 9 |
| Voranol CP 450 | 8.5 | 8.5 | 13 |
| Voranol RH 360 | 8.5 | 8.5 | 6.5 |
| Tercarol 5902 | 10 | 10 | 8 |
| Voranol RA 640 | 6 | 6 | 6 |
| Simulsol TOGE | 2 | 2 | 3 |
| Total | 100 | 100 | 100 |
| Tg* (° C.) | 74 | 66.28 | 73.66 |

*Tg is measured by differential scanning calorimetry (DCS) analysis using TA Instrument DSC Q200. Experimental conditions: temperature ramp from 25° C. to 180° C. at 10° C./min; nitrogen atmosphere flow at 50 ml/min; pan Aluminium TZero Hermetic. Samples are cooled back to 25° C. at 10° C./min and then again heated to 180° C. with a 10° C./min ramp.

The results indicated the polyester of the present invention, although having a lower aromatic content than the polyester, due the low viscosity, can be used in higher levels in formulations giving a product with Tg properties similar to a control.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A process for making a rigid foam comprising the step of reacting an organic polyisocyanate with a polyol blend at an isocyanate index of from 90 to 400 in the presence of a blowing agent wherein the polyol blend comprises
   a) 10 to 90 weight percent of a polyester polyol and
   b) the remainder of the polyol blend is at least one polyol having a functionality of 2 to 8 and a hydroxyl number of 200 to 1,200
   wherein the polyester is the reaction product of a reaction mixture consisting essentially of:
   A) an aromatic component comprising 80 mole percent or greater of terephthalic acid;
   B) a polyethylene glycol having a molecular weight from 150 to 1000; and
   C) a glycol different from the glycol of B);
   wherein A, B, and C are provided in amounts in the reaction mixture on a percent weight bases of 20 to 60 weight percent A); 40 to 75 weight percent of B); and 5 to 35 weight percent of C) and the polyester polyol has a hydroxyl number of 200 to 400 and a viscosity of less than 5,000 mPa*s at 25° C. as measured by UNI EN IAO 3291.

2. The process of claim 1 wherein the aromatic component comprises 85 mole percent or greater of terephthalic acid.

3. The process of claim 2 wherein the aromatic component comprises 95 mole percent or greater of terephthalic acid.

4. The process of claim 3 wherein the polyethylene glycol has a molecular weight of less than 500.

5. The process of claim 1 wherein C) of the reaction mixture is ethylene glycol, diethylene glycol, or a oxyalkylene glycol of the formula:

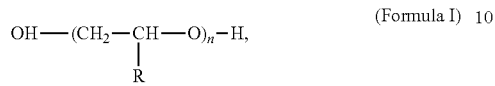

(Formula I)

where R is hydrogen or a lower alkyl of 1 to 4 carbon atoms and n is from 1 to 5 with the proviso that at least 10 percent of the R moieties are a lower alkyl group.

6. The process of claim 5 wherein C) of the reaction mixture is ethylene glycol or diethylene glycol.

7. The process of claim 1 wherein the polyester polyol has a viscosity of less than 2500 mPa*s at 25° C. as measured by UNI EN ISO 3219 and a hydroxyl number of 200 to 400.

8. The process of claim 7 wherein the polyester polyol has a viscosity of 2000 mPa*s or less.

9. The process of claim 1 wherein the polyisocyanate is of the diphenylmethane-4,4'-diisocyanate series.

* * * * *